United States Patent
Ahn

(10) Patent No.: US 7,950,945 B2
(45) Date of Patent: May 31, 2011

(54) SIM CARD CONNECTING DEVICE FOR PORTABLE ELECTRONIC DEVICE

(75) Inventor: Hae-Won Ahn, Gyeongsangbuk-do (KR)

(73) Assignee: Samsung Electronics Co., Ltd., Yeongtong-Gu, Suwon-Si, Gyeonggi-Do (KR)

( * ) Notice: Subject to any disclaimer, the term of this patent is extended or adjusted under 35 U.S.C. 154(b) by 0 days.

(21) Appl. No.: 12/627,157

(22) Filed: Nov. 30, 2009

(65) Prior Publication Data

US 2010/0136816 A1    Jun. 3, 2010

(30) Foreign Application Priority Data

Dec. 3, 2008   (KR) .................. 10-2008-0121829

(51) Int. Cl.
*H01R 13/62* (2006.01)
(52) U.S. Cl. ...................... 439/325; 439/630
(58) Field of Classification Search .................. 439/325, 439/326, 630
See application file for complete search history.

(56) References Cited

U.S. PATENT DOCUMENTS

| | | | | |
|---|---|---|---|---|
| 5,894,597 A | * | 4/1999 | Schwartz et al. | 455/558 |
| 6,068,516 A | * | 5/2000 | Chang | 439/633 |
| 6,293,464 B1 | * | 9/2001 | Smalley, Jr. | 235/451 |
| 7,048,566 B2 | * | 5/2006 | Natori | 439/326 |
| 7,384,294 B2 | * | 6/2008 | Washino et al. | 439/326 |
| 7,442,087 B2 | * | 10/2008 | Long et al. | 439/630 |

* cited by examiner

*Primary Examiner* — Hae Moon Hyeon
(74) *Attorney, Agent, or Firm* — Cha & Reiter, LLC

(57) ABSTRACT

A Subscriber Identity Module (SIM) card connecting device for a portable electronic device which is adapted to further reduce a thickness of the portable electronic device by limiting the height of the SIM card connecting device. The device includes: a printed circuit board (PCB); one or more patterned contacts provided on the PCB and being coupled with one or more contacts formed on the SIM card; and a housing mounted on the PCB for allowing the SIM card to be inserted into/extracted from the housing. The housing presses the inserted SIM card so that the contacts of the SIM card and the patterned contacts come into substantial pressurized contact and/or pressurized contact with each other, depending on a shape of the patterns. According to the present invention, the SIM card mounting space can be reduced, and the portable electronic device can have a further reduction in thickness.

27 Claims, 12 Drawing Sheets

SIM CARD CONNECTING DEVICE FOR PORTABLE ELECTRONIC DEVICE

CLAIM OF PRIORITY

This application claims the benefit of priority from an application entitled "SIM Card Connecting Device For Portable Electronic Device" filed in the Korean Intellectual Property Office on Dec. 3, 2008 and assigned Ser. No. 10-2008-0121829, the contents of which are hereby incorporated by reference in its entirety.

BACKGROUND OF THE INVENTION

1. Field of the Invention

The present invention relates to a SIM card for a portable electronic device. More particularly, the present invention relates to methods and apparatuses for a portable electronic device adapted permitting a portable electronic device to be further reduced in size.

2. Description of the Related Art

Recently, portable electronic devices, such as MP3 players, PDPs (Portable Display Players), portable terminals, and PDAs (Personal Digital Assistants), have become widely popular. In particular, as information communication technologies have been developed and portable terminals have gradually come into wide use due to the portability thereof, various functions, such as camera functions, MP3 player functions, games, etc. are incorporated in the portable terminals. In addition, portable terminals of various designs come into the market due to consumers' desires as well as various functions.

Such portable terminals are generally classified via their transmission protocol into a European GSM (Global System for Mobile communications) type which is combined with a TDMA (Time Division Multiple Access) type, a North American TDMA type, and a CDMA (Code Division Multiple Access) type in accordance with communication methods thereof. Among them, a GSM-type portable terminal is equipped with an SIM (Subscriber Identification Module) card. The GSM-type is an international standard for assuring compatibility between various network operators, and is widely employed in various countries in the word, including Europe. GSM-type also enjoys popularity because the SIM card and/or its data is transferable to different phones when in an area that transmits using, for example, a somewhat different frequency.

A SIM card used in such a GSM-type includes almost all the information items necessary for operating a portable terminal, in particular, data including subscriber-related information items, such as phone numbers and network numbers, as well as subscriber's personal information items, such as a password.

Therefore, since all the GSM portable terminals are provided with a Subscriber Identity Module (SIM) card contacting device for receiving a SIM card, a user will be allowed to use any type of GSM portable terminals if only the user has a SIM card.

As shown in FIG. 1, a SIM card connecting device 10 for a conventional portable electronic device includes a socket 11, a bottom surface 12 formed in the socket 11 and opposed to one side of the SIM card 20, and a pair of supports 13 extending parallel to each other from the opposite lateral edges of the bottom surface 12 so as to support the other side of the SIM card 20. On the bottom surface 12, a plurality of connectors 15 protrude to be coupled with the SIM card 20, wherein the connectors 15 are mounted on a printed circuit board 30 positioned within the socket 11. Sleeves 14 have an edge surface parallel to the bottom surface so as to hold the SIM card 20 within the socket 11.

As shown in FIG. 2, the one side of the SIM card 20 is formed with connecting parts 21 in the pattern of the printed circuit board, so that the connecting parts 21 are to be in contact with the connectors 15, respectively, whereby the information items stored in the SIM card 20 will be transmitted to the portable electronic device through the printed circuit board 30.

That is, as shown in FIG. 3, when the SIM card 20 is inserted into the socket 11, the connectors 15 protruding from the bottom surface 12 of the socket 11 come into close contact with the connecting parts 21 of the SIM card 20, and are maintained in that condition. More specifically, since the connectors 15 protruding from the bottom surface 12 of the socket 11 provide elastic force, while the SIM card 20 is being supported by the supports 13, the connecting parts 21 of the SIM card 20 press the connectors 15 protruding from the bottom surface 12, whereby the connectors 15 come into close contact with the connecting parts 21 of the SIM card 20 due to the elastic force thereof.

However, the SIM card 20 is inserted from an end of the socket 11 so as to be assembled to the socket 11, and friction is produced between the connectors 15 and the connecting parts 21 of the SIM card 20 at that time. The friction between the connectors 15 and the connecting parts 21 of the SIM card 20 causes damage, such as scratches, to the patterns of the connecting parts 21 on the printed circuit board. As a result, there is a problem in that if the SIM card 20 is used for a long time, poor contact is caused between the connectors 15 and the connecting parts 21.

In addition, since the connectors 15 protrude from the bottom surface 12 so as to stably maintain the connection of the SIM card 20, it is necessary for the socket 11 to have a height not only for allowing the insertion of the SIM card 20 but also for allowing the SIM card 20 to be coupled with the connectors 15 when the SIM card 20 is inserted into the socket 11. Typically, the SIM card mounting height in the socket 11 is in the range of about 2.3 to 3.0 mm.

Therefore, even if the connectors 15 are elastically pressed when they are coupled with the SIM card 20, the connectors 15 protrude to a predetermined height from the bottom surface 12. Therefore, there is a problem in that the thickness of the portable electronic device is increased by the height of the socket 11.

Therefore, what is needed is a SIM card connecting device for a portable electronic device, which prevents the connectors 15 from protruding from the bottom surface 12, and allows the connectors 15 to be maintained in the closely contacted state with the contacts 21.

SUMMARY OF THE INVENTION

Accordingly, the present invention has been made to provide a SIM card connecting device for a portable electronic device including patterned contacts on a side of a printed circuit board, and a housing capable of not only allowing one or more contacts on the SIM card to be engaged with the patterned contacts, respectively, but also of pressing the SIM card to retain a proper electrical connection with the contacts.

Also, the present invention provides a SIM card connecting device for a portable electronic device, which allows the stable connection state between the contacts on the SIM card and the patterned contacts to be maintained.

In addition, the present invention provides a SIM card connecting device for a portable electronic device, wherein the housing for mounting the SIM card is formed in a size to permit the insertion of the SIM card so that the SIM card mounting space in the portable electronic device can be minimized, whereby the portable electronic device can be made with reduced thickness.

Moreover, the present invention provides a SIM card connecting device for a portable electronic device, which does not employ a conventional socket with connectors protruding to be engaged with the contacts on the SIM card, and which is capable of maintaining the coupled state between the SIM card and the printed circuit board.

In accordance with an exemplary aspect of the present invention, there is provided a SIM card connecting device for a portable electronic device, including: a printed circuit board; and one or more patterned contacts provided on the printed circuit board, which come into contact with one or more contacts on the SIM card, respectively; and a housing mounted on the printed circuit board, wherein the housing allows the SIM card to be inserted into/extracted from the housing, and when the SIM card is inserted into the housing, the housing presses the SIM card so that the contacts of the SIM card and the patterned contacts come into substantially pressurized contact with each other.

Each of the patterned contacts is preferably formed in a dome shape, so that the patterned contacts are pressed when they come into contact with the contacts, whereby the SIM card and the printed circuit board are electrically coupled with each other.

In accordance with another exemplary aspect of the present invention, there is provided a SIM card connecting device for a portable electronic device, including: a printed circuit board; one or more patterned contacts provided on the printed circuit board, the patterned contacts being coupled with one or more contacts formed on the SIM card; and a housing mounted on the printed circuit board, wherein the housing allows the SIM card to be inserted into/extracted from the housing, and when the SIM card is inserted into the housing, the housing presses the SIM card so that the contacts of the SIM card and the patterned contacts come into pressurized contact with each other, wherein the patterned contacts are coplanar to the side of the printed circuit board where the patterned contacts are provided, and the contacts of the SIM card protrude toward the patterned contacts, thereby coming into pressurized contact with the patterned contacts.

In accordance with another exemplary aspect of the present invention, there is provided a SIM card connecting device for a portable electronic device, including: a printed circuit board; one or more patterned contacts provided on the printed circuit board, the patterned contacts being coupled with one or more contacts formed on the SIM card; and a housing mounted on the printed circuit board, wherein the housing allows the SIM card to be inserted into/extracted from the housing, and when the SIM card is inserted into the housing, the housing presses the SIM card so that the contacts of the SIM card and the patterned contacts come into pressurized contact with each other, wherein the patterned contacts are formed coplanar to the side of the printed circuit board where the patterned contacts are provided, and the contacts of the SIM card are formed coplanar to the side of the SIM card where the contacts are formed, so that the contacts of the SIM card are in pressurized contact with the patterned contacts by the housing.

BRIEF DESCRIPTION OF THE DRAWINGS

The above and other exemplary aspects, features and advantages of the present invention will become more apparent from the following detailed description taken in conjunction with the accompanying drawings, in which.

DETAILED DESCRIPTION

Figure 1:
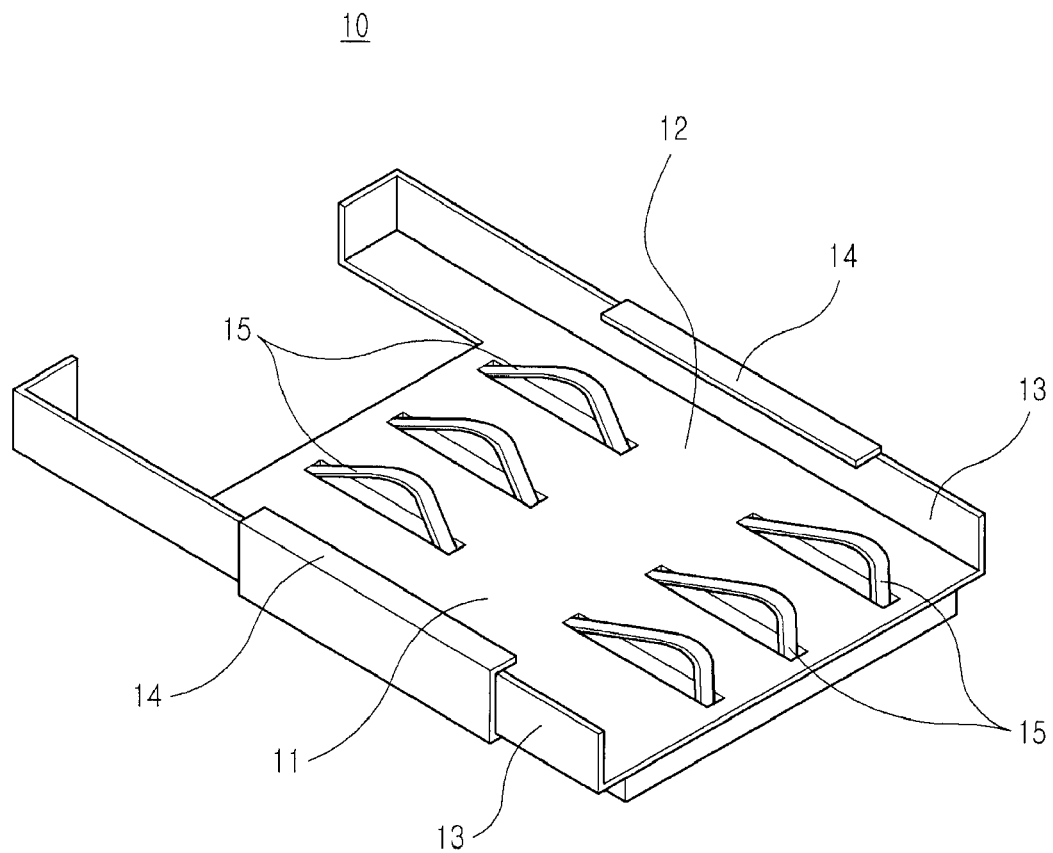
FIG. 1 is a perspective view showing a conventional SIM card connecting device for a portable electronic device.
Figure 2:
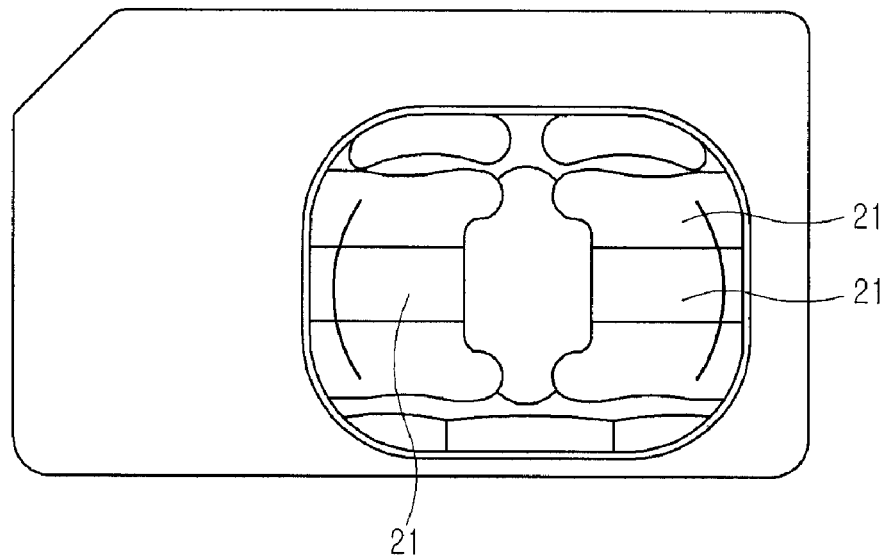
FIG. 2 is a top plan view of a conventional SIM card for a portable electronic device.
Figure 3:
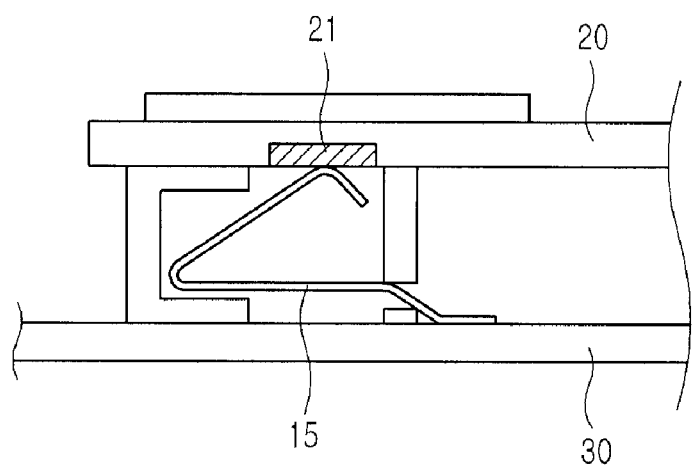
FIG. 3 is a cross-sectional view showing the SIM card assembled to the socket shown in FIG. 1.

Hereinafter, exemplary embodiments of the present invention will be described with reference to the accompanying drawings. In the following description, the same or similar elements will be designated by the same reference numerals although they are shown in different drawings. Further, various specific definitions found in the following description, such as specific values of packet identifications, contents of displayed information, etc., are provided only for illustrative purposes to help a person of ordinary skill in the art with a general understanding of the present invention, and it is apparent to those skilled in the art that the present invention can be implemented without such definitions. Further, in the following description of the present invention, a detailed description of known functions and configurations incorporated herein will be omitted when it may obscure appreciation of the subject matter of the present invention by the person of ordinary skill in the art.

As shown in FIGS. 4 to 11, a SIM card connecting device 100a for a portable electronic device according to a first exemplary embodiment of the present invention includes a printed circuit board 130 adapted to be electrically coupled with a SIM card 110 mounted in the SIM card connecting device, one or more patterned contacts 131a, and a housing 120.

The patterned contacts 131a are provided on the printed circuit board 130 to come into contact with contacts on the SIM card 110. The housing 120 is mounted on the printed circuit board 130 in such a manner that the housing 120 allows the SIM card 110 to be inserted into/extracted from the housing 120, and when the SIM card 110 is inserted, the housing 120 presses the SIM card 110 downward toward the printed circuit board 130 so that the contacts 111a of the SIM card 110 and the patterned contacts 131a of the printed circuit board 130 are closely contacted with each other.

As shown in the examples in FIGS. 4, 9, 10 and 11, each of the patterned contacts 131a is formed in a preferred dome shape, so that patterned contacts 131a are pressed when they come into contact with the contacts 111a, whereby the SIM card is electrically coupled with the printed circuit board 130. The housing 120 includes an inlet part 121, through which the SIM card is inserted into/extracted from the housing 120, a plate 122, and anchoring parts 123. The plate 122 extends from the inlet part 121 in the direction of inserting the SIM card 110, and is spaced from the printed circuit board 130 by a predetermined height. The anchoring parts 123 protrude from the plate 122 toward the printed circuit board 130, so that they can be anchored to the printed circuit board 130. In addition, the anchoring parts 123 are engaged with the opposite lateral edges of the SIM card 110, so that they can guide the insertion/extraction of the SIM card 110.

In addition, the plate 122 is formed with an elastic pressing means 1220 at a position corresponding to the contacts 111a (shown in FIGS. 8 and 10) of the SIM card 110 and the patterned contacts 131a, so that when the SIM card 110 is inserted, the elastic pressing means 1220 presses the position of the contacts 111a downward toward the patterned contacts, thereby providing elastic force for making the contacts 111a come into close contact with the patterned contacts 131a.

As shown in FIGS. 4 to 7, 9 and 10, the elastic pressing means 1220 consists of one or more holes 1222 and one or more leaf springs 1221. Each of the holes 1222 is formed through the plate 122. The leaf springs 1221 are formed at a position corresponding to the contacts 111a of the SIM card 110 and the patterned contacts 131a. Each of the holes 1222 is provided with one or more leaf springs 1221, wherein the leaf springs are preferably positioned vertically above the contacts 111a of the SIM card 110 and the patterned contacts 131a. A person of ordinary skill in the art understands and appreciates it is within the spirit of the invention and the scope of the appended claims that other types of biasing elements can be provided in addition to or instead of the leaf springs 1221.

Figure 6:
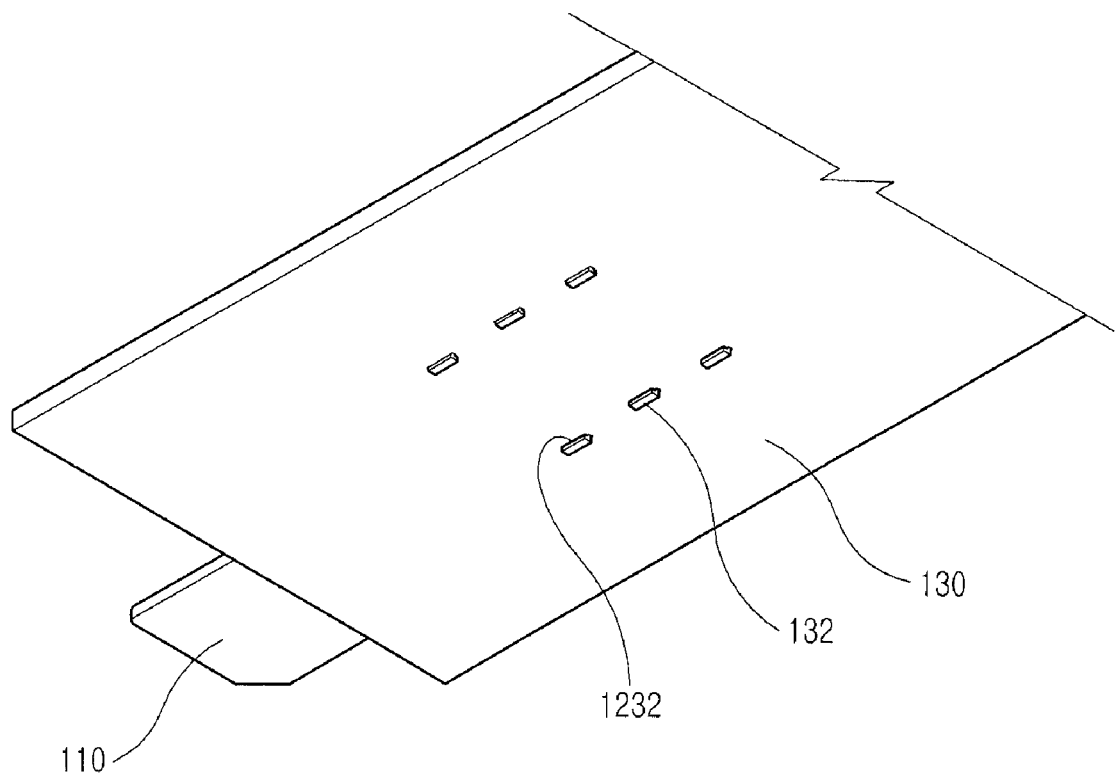
FIG. 6 is a bottom side perspective view of a printed circuit board in the SIM card connecting device according to the first exemplary embodiment of the present invention in the assembled state.
Figure 9:
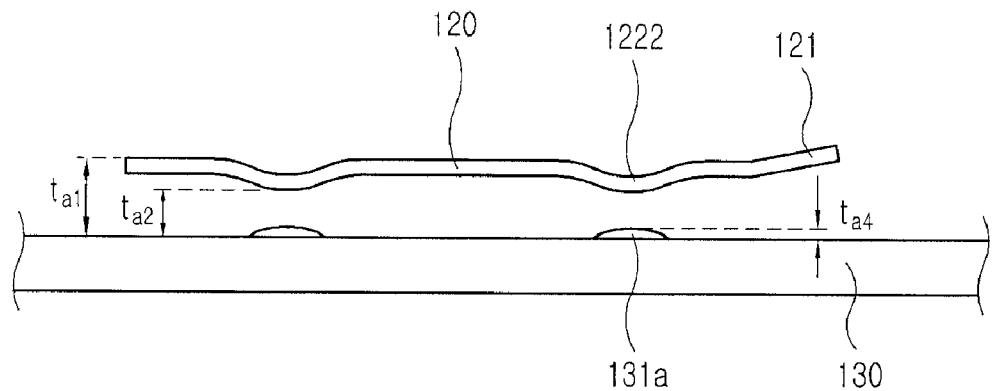
FIG. 9 is a cross-sectional view of the SIM card connecting device according to the first exemplary embodiment of the present invention.
Figure 10:
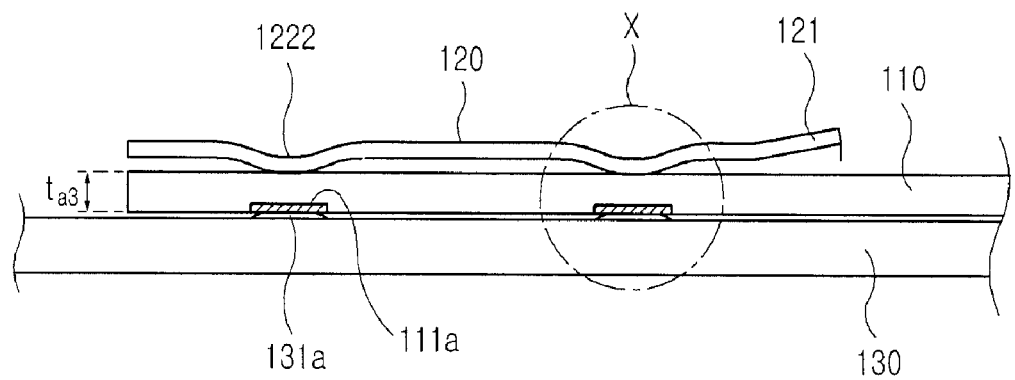
FIG. 10 is a cross-sectional view taken along line A-A' in FIG. 7.

As shown in FIGS. 6, 9 and 10, the inlet part 121 is formed to be upwardly slanted from the surface of the plate 122, so that the insertion of the SIM card 110 can be guided.

Figure 4:
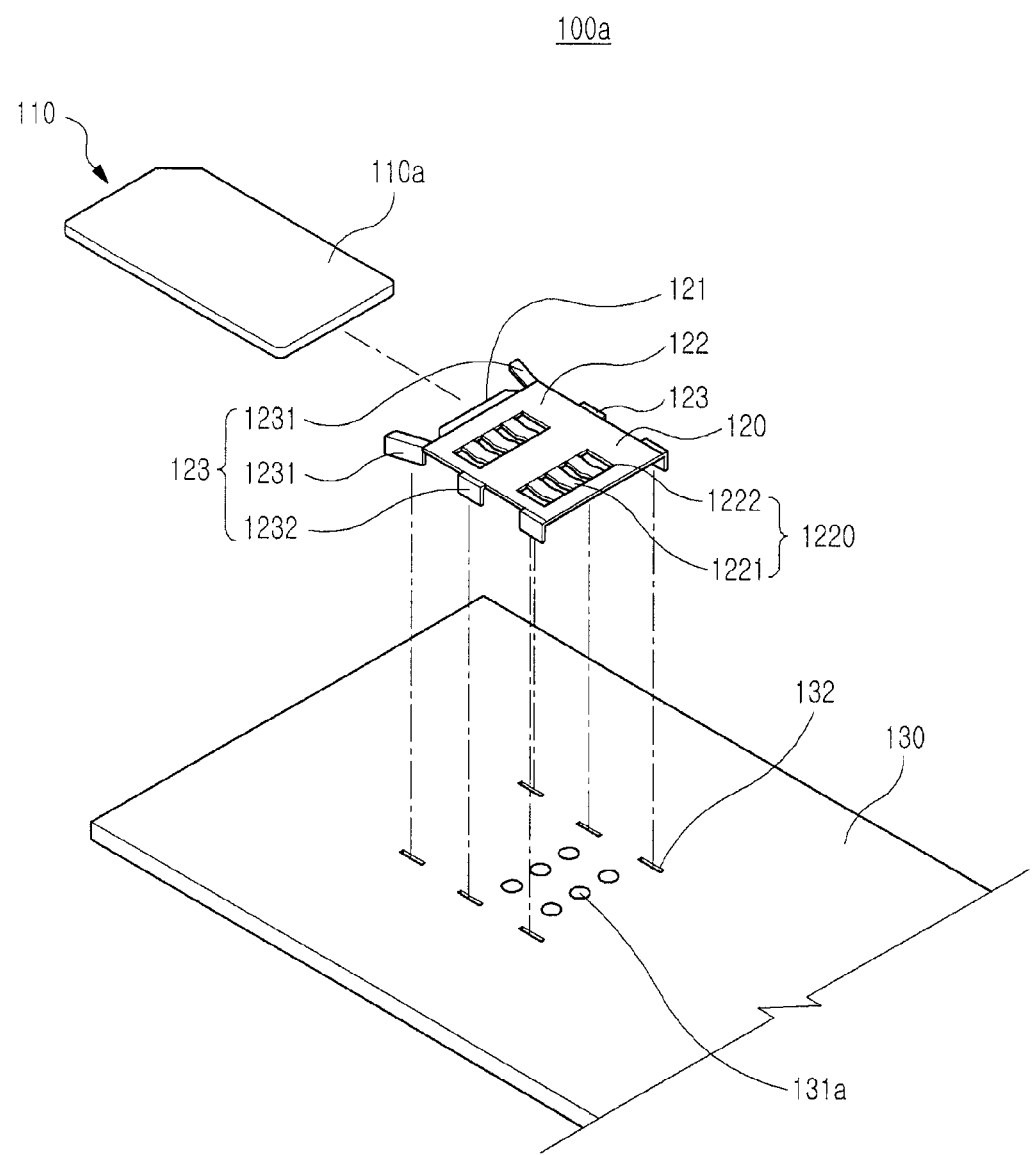
FIG. 4 is an exploded perspective view of a SIM card connecting device for a portable electronic device according to a first exemplary embodiment of the present invention.
Figure 5:
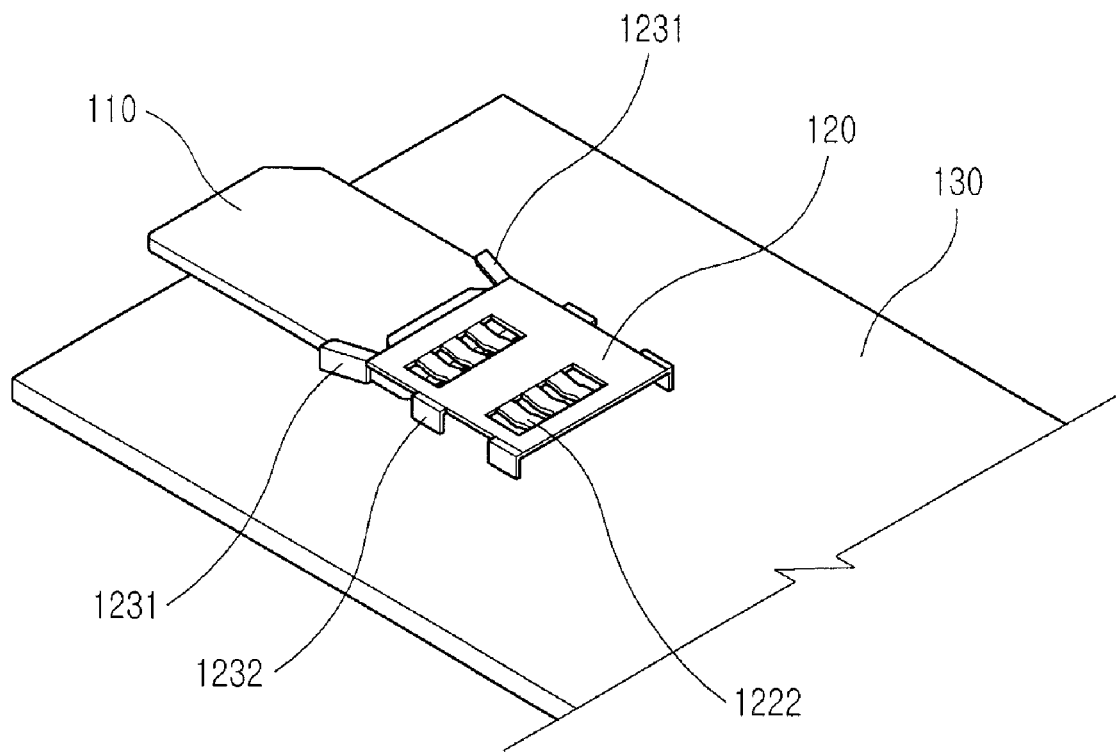
FIG. 5 is a top side perspective view of the SIM card connecting device according to the first exemplary embodiment of the present invention in the assembled state.

As shown in FIGS. 4 to 6, the anchoring parts 123 consist of a pair of guide anchoring protrusions 1231, and anchoring protrusions 1232. The guide anchoring protrusions 1231 extend in the direction of extracting the SIM card 110 from the opposite sides of the inlet part 121 so that they can guide the insertion of one end of the SIM card 110. In addition, the guide anchoring protrusions 1231 are anchored to the printed circuit board 130. The anchoring protrusions 1232 protrude from the opposite lateral edges of the plate 122 toward the printed circuit board 130 and are anchored to the printed circuit board 130. Each of the lateral edges of the plate 122 is formed with at least one of the anchoring protrusions 1232 so that when the SIM card 110 is inserted into the housing 120, the opposite lateral edges of the SIM card 110 are engaged with the anchoring protrusions 1232. Therefore, the anchoring protrusions 1232 on the opposite lateral edges of the plate 122 are preferably spaced from each other by a distance similar to the width of the SIM card 110, so that the SIM card can be introduced between the anchoring protrusions 1232 on the opposite lateral edges of the plate 122.

Figure 7:
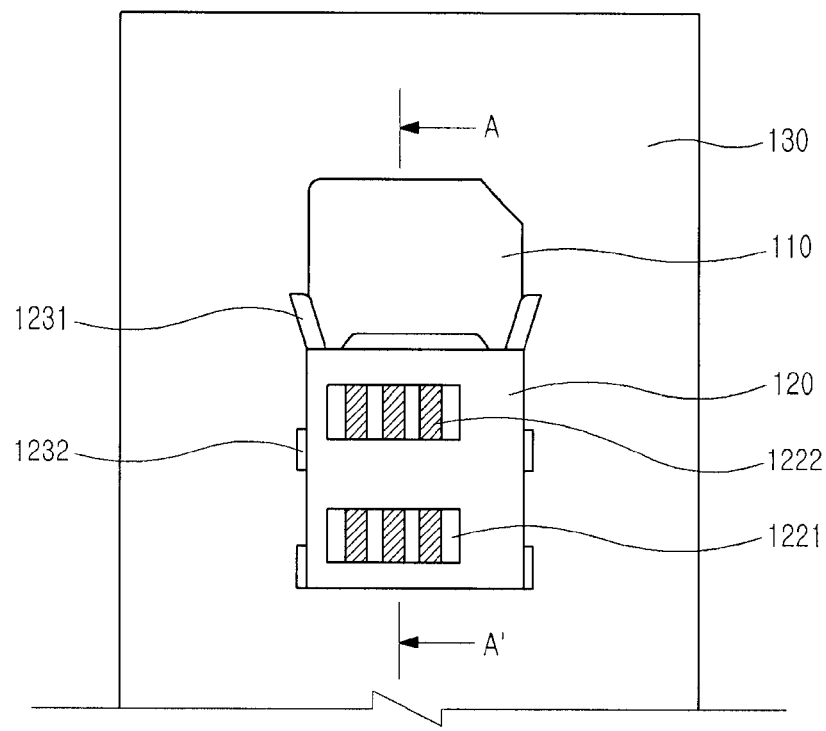
FIG. 7 is a top plan view of the SIM card connecting device according to the first exemplary embodiment of the present invention in the assembled state.
Figure 8:
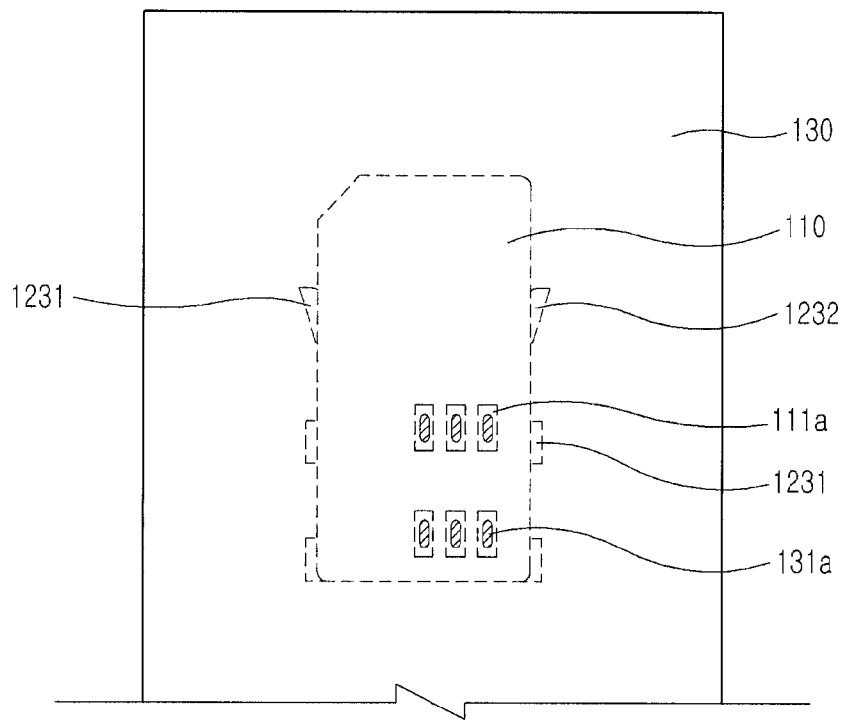
FIG. 8 is a bottom view of the SIM card connecting device according to the first exemplary embodiment of the present invention in the assembled state.

As shown in FIGS. 6 to 8, it is preferable that the guide anchoring protrusions 1231 are oppositely formed and gradually diverge from each other as going away from the plate 120. Due to this divergent construction, the end of the SIM card 110 can be easily inserted into the housing 120.

As shown in FIGS. 4 to 6, the printed circuit board 130 is formed preferably with mounting holes 132, to which the anchoring parts 123 are inserted, respectively. One end of each of the anchoring parts 123 is inserted into the corresponding mounting hole 132, and then subjected to Surface Mount Device (SMD) soldering, thereby being soldered to the other side of the printed circuit board 130.

Figure 11:
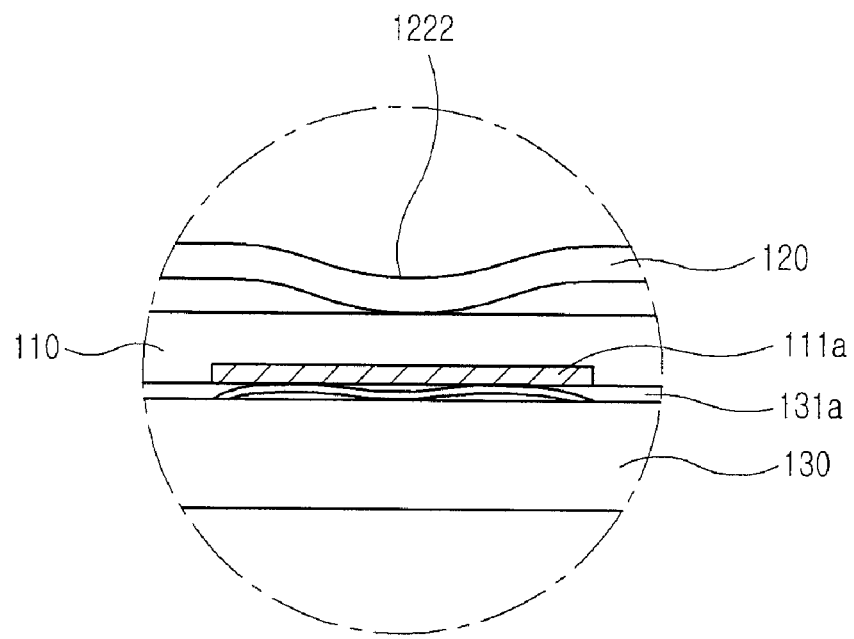
FIG. 11 is an enlarged view of "X" part in FIG. 10.

As shown in FIG. 5, if the SIM card 110 is inserted into the housing 120, the leading end of the SIM card 110 is guided to be introduced into the inside of the housing 120 by the inlet part 121 and the guide anchoring protrusions 1231. In addition, as shown in FIG. 7, if the SIM carded is seated within the housing 120, the contacts 111a of the SIM card 110 come into substantially pressurized contact with the dome-shaped patterned contacts 131a on the printed circuit board 131, and then press the position of the contacts 111a, as shown in FIGS. 10 and 11. Consequently, the contacts 111a and the patterned contacts 131a are in substantially pressurized contact with each other, which can be defined as contact sufficient that the dome-shaped patterned contacts 131a are pressed at least partially downward by the SIM card contacts 111a, such as shown in FIG. 11, whereby the SIM card 110 is electrically coupled with the printed circuit board 130.

Now, the operation of the SIM card connecting device for a portable electronic device according to the first embodiment of the present invention constructed as described above will be described in more detail with reference to the examples shown in FIGS. 4 to 11.

In order to render data stored in a SIM card 110 to be represented by the portable electronic device, a SIM card connecting device is provided on a printed circuit board 130. The SIM card connecting device includes patterned contacts 131a and a housing 120. The patterned contacts 131a are formed on one side of the printed circuit board 130, so that the patterned contacts 131a come into contact with contacts 111a on the SIM card 110 introduced into the housing 120. Each of the patterned contacts 131a is dome-shaped, so that when the SIM card 110 is inserted into or extracted from the housing, pressure is applied to or released from the patterned contacts 131a. Since the thickness of the SIM card 110 is generally in the range of about 0.8 to 0.9 mm (ta3), the dome-shaped patterned contacts 131a preferably have a height in the range of about 0.2 to 0.3 mm (ta4). The height from the printed circuit board 130 to a plate 121 as described above is about 1.6 mm (ta1), and the height from the printed circuit board to the lowest point of the leaf springs is about 1.1 mm (ta2).

In addition, the contacts 111a of the SIM card 110 are preferably provided in a 2*3 format on the SIM card 110. Therefore, the patterned contacts 131a are also preferably provided in the 2*3 format, so that the patterned contacts 131a are engaged with the contacts 111a of the SIM card 110. A person of ordinary skill in the art understands and appreciates that the 2*3 format is merely exemplary. In addition, anchoring parts 123 to be anchored to the printed circuit board 130 are formed on the opposite lateral edges of the plate 122 of the housing 120. The anchoring parts 123 have a predetermined height and are anchored to the print circuit board 130 in such a manner that a space is formed in the inside of the plate 122 for allowing the SIM card 110 to be introduced into and seated in the inside of the plate 122. The printed circuit board 130 is formed with mounting holes 132, into which the anchoring parts 123 are inserted, respectively. The ends of the anchoring parts 123 protruding from the bottom side of the printed circuit board 130 through the mounting holes 132 are subjected to SMD soldering, whereby the anchoring parts 123 are soldered to the printed circuit board 130.

The anchoring parts 123 may be classified into guide anchoring protrusions 1231 and anchoring protrusions 1232. The guide anchoring protrusions 1231 are anchored to the printed circuit board 130. In addition, the guide anchoring protrusions 1231 are formed in a pair at the opposite sides of the inlet part 121 of the housing 120 so that the guide anchoring protrusions 1231 render the leading end of the SIM card 110 to be easily inserted into the inlet part 121, and guide the insertion of the leading end of the SIM card 110. That is, the pair of guide anchoring protrusions 1231 extend from the opposite lateral edges of the plate 122 to be opposed to one another, and diverge as going away from the plate 122, whereby the SIM card 110 can be more easily inserted into the housing 120. The plate 122 is formed with one or more holes 1222, and leaf springs 1221. The holes 1222 are formed to correspond to the contacts of the SIM card 110 in terms of position, and it is shown in the drawings that the holes 122 are positioned above the contacts 111a of the SIM card 110 arranged in the 2*3 format.

In addition, the leaf springs 1221 are formed in the holes 1222 so as to provide elastic force to the printed circuit board 130 when the SIM card 110 is inserted. The leaf springs 1221 are formed on the plate 122 to correspond to the contacts 111a of the SIM card 110 in terms of position, and if the SIM card 110 is seated in the housing 120, the leaf springs 1221 press the contacts 111a of the SIM card 110 through the patterned contacts 131a. Therefore, it is desired to form the leaf springs 1221 to correspond to the contacts 111a in terms of position. Since the thickness of the SIM card 110 is generally in the range of about 0.8 to 0.9 mm (ta3), the height to the top side of the plate 122 from the printed circuit board 130 is about 1.6 mm, and the height from the lowest point of the leaf springs 1221 protruding toward the printed circuit board 130 to the printed circuit board 130 is about 1.1 mm (ta2). Therefore, the leading end of the SIM card 110 is guided by the anchoring parts to be introduced into the housing 120.

If the SIM card 110 is entirely introduced into the housing 120, the contacts 111a of the SIM card 110 are engaged with the dome-shaped patterns 131a on the printed circuit board 130. Since the leaf springs 1221 are formed in the plate 122 at the position corresponding to the contacts 111a and the patterned contacts 131a, the top side of the SIM card 110 at the position corresponding to the contacts 111a is elastically pressed when the contacts 111a and the patterned contacts 131a are engaged with each other.

Consequently, the contacts 111a are maintained in the substantially pressurized contacted state with the patterned contacts 131a. At this time, the dome-shaped patterned contacts 131a are pressed, whereby the SIM card is electrically coupled with the printed circuit board 130 as shown in FIGS. 10 and 11. As such, the data stored in the SIM card 110 can be confirmed through the portable electronic device.

Therefore, since the SIM card connecting device for a portable electronic device according to the first exemplary embodiment of the present invention can be reduced in terms of thickness as compared to a conventional socket, the space occupied by the SIM card connecting device in the portable electronic device can be reduced, whereby the portable electronic device can be further slimmed. In addition, since each of the patterned contacts 131a is formed in a dome shape, and the contact side of the SIM card 110 is pressed through the leaf springs formed in the plate 122, the contact between the contacts 111a and the patterned contacts 131a can be stably maintained, and the failure of the contacts 111a can be prevented.

Now, a second exemplary embodiment of the present invention will be described in detail with reference to FIGS. 12 to 16. Here, it should be noted that among the components of the second exemplary embodiment, the components identical to those of the first exemplary embodiment will not be described in detail but indicated by the reference numerals used in the description of the first exemplary embodiment of the present invention.

Figure 14:
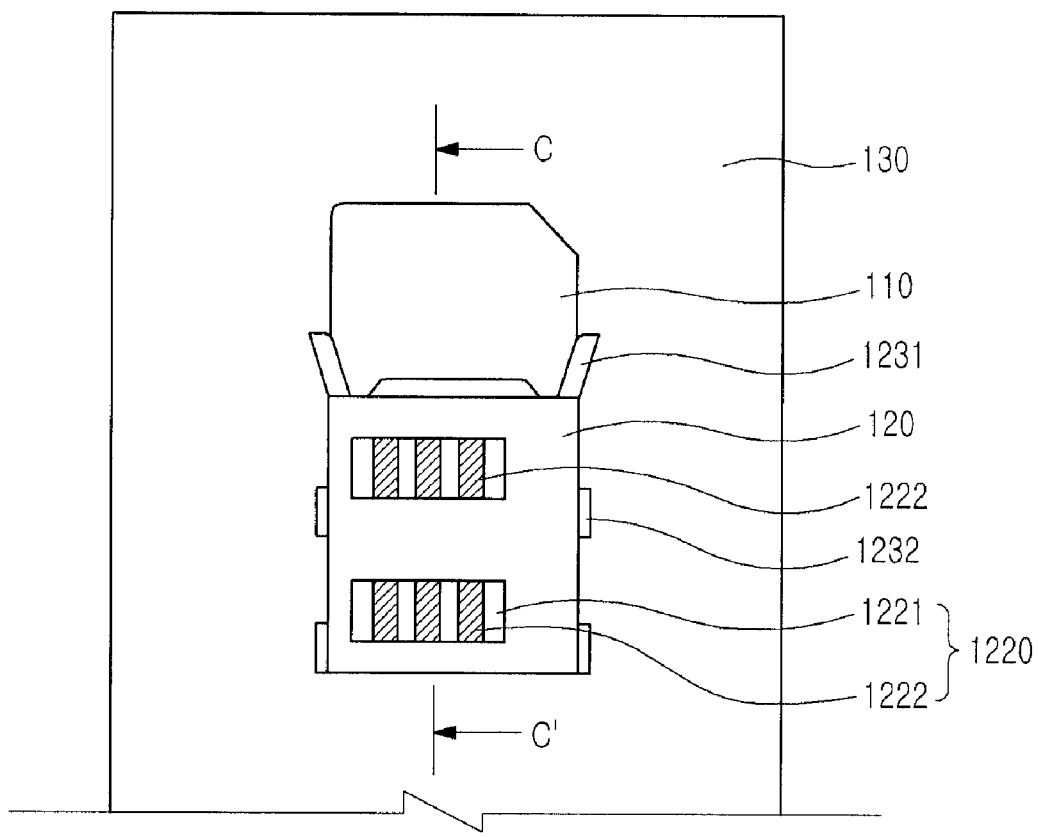
FIG. 14 is a top plan view of the SIM card connecting device according to the second exemplary embodiment of the present invention in the assembled state.
Figure 15:
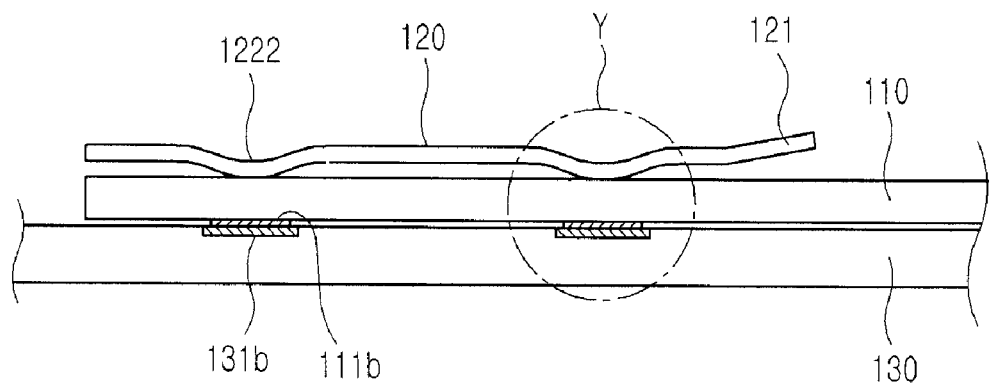
FIG. 15 is a cross-sectional view of the SIM card connecting device according to the second exemplary embodiment of the present invention in the assembled state.
Figure 16:
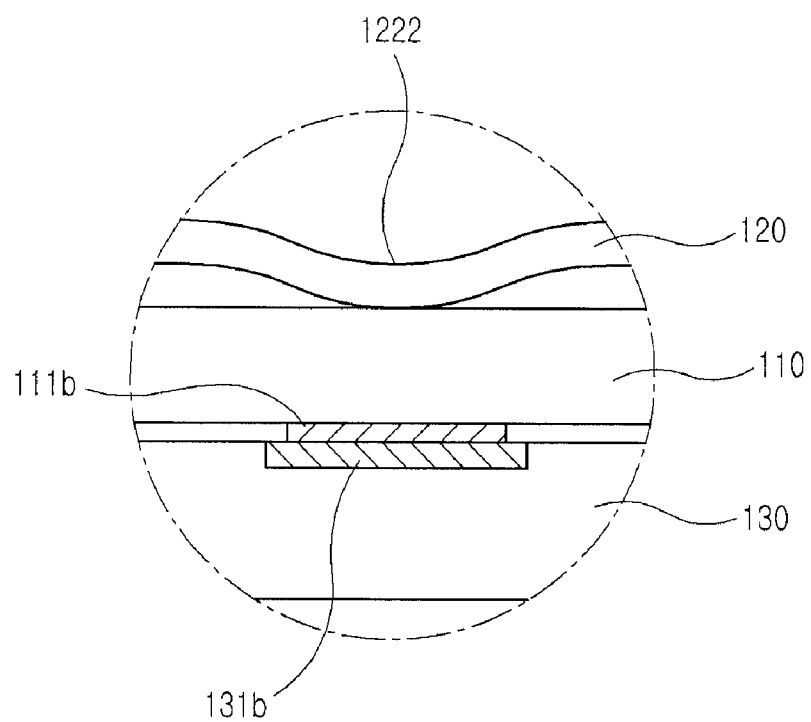
FIG. 16 is an enlarged view of "Y" part in FIG. 15.

As shown in FIGS. 14 to 16, the SIM card connecting device for a portable electronic device according to the second exemplary embodiment includes a printed circuit board 130, patterned contacts 131b, and a housing 120.

As shown in FIGS. 15 and 16, the patterned contacts 131b are provided on the printed circuit board 130 in such a manner that the patterned contacts 131b are engaged with contacts 111b provided on the SIM card 110. The housing 120 is mounted on the printed circuit board 130, wherein the housing 120 allows the SIM card 110 to be inserted into/extracted from the housing 120, and when the SIM card 110 is inserted into the housing 120, the housing applies pressure in such a manner that the contacts 111b on the SIM card 110 and the patterned contacts 131b on the printed circuit board 130 come into pressurized contact with each other, in which the pressurized contact is provided by the biasing of the leaf springs 1221.

As shown in FIGS. 12, 13, 15 and 16, the patterned contacts 131b of SIM card 110 are formed coplanar to the side of the printed circuit board 130 where the patterned contacts are formed, and the contacts 111b of the SIM card 110 protrude toward the patterned contacts 131b, wherein the contacts 111b come into pressurized contact with the patterned contacts 131b, respectively.

The second exemplary embodiment of the present invention is differentiated from the first exemplary embodiment in terms of the SIM patterns 131b being formed on the printed circuit board 130, and the contacts 111b being formed on the SIM card 110.

For example, in the first exemplary embodiment, the patterned contacts 131a formed on the printed circuit board are dome-shaped (as shown in FIGS. 10 and 11), but in the second exemplary embodiment, the patterned contacts 131b are formed coplanar to the side of the printed circuit board 130 where the patterned contacts 131b are provided as shown in FIGS. 15 and 16.

Figure 12:
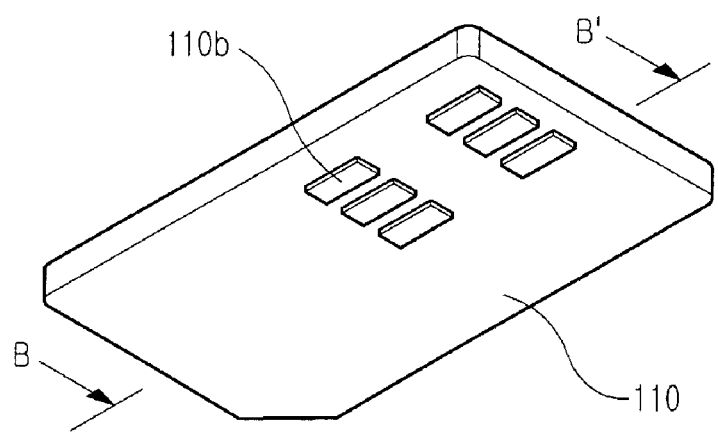
FIG. 12 is a perspective view showing a SIM card mounting part in a SIM card connecting device for a portable electronic apparatus according to a second exemplary embodiment of the present invention.
Figure 13:
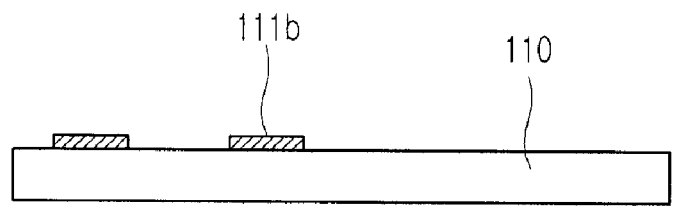
FIG. 13 is a cross-sectional view taken along line B-B' in FIG. 12.

In addition, the contacts 111a in the first exemplary embodiment are formed coplanar to the bottom side of the SIM card, but the contacts 111b in the second exemplary embodiment protrude by a predetermined height from the side of the bottom SIM card 110, as shown in the examples of FIGS. 12, 13 and 15.

Preferably, the thickness of the SIM card 110 according to the second exemplary embodiment is typically in the range of about 0.8 to 0.9 mm (ta3), and the contacts 111b protrude about 0.1 mm (tb4) from the SIM card 110.

In addition, in the second exemplary embodiment, as shown in FIG. 9, the height from the printed circuit board 130 to the plate 122 is preferably about 1.5 mm, and the height from the lowest point of the leaf springs 1221 to the printed circuit board 130 is preferably in the range of about 0.9 to 1.0 mm.

Since the construction of the housing 120 is the same with that of the first exemplary embodiment, its detailed description will be omitted.

Now, the operation procedure of the SIM card connecting device according to the second exemplary embodiment will be described with reference to FIGS. 6, and 12 to 16.

As shown in FIG. 6, the leading end of the SIM card 110 is guided by the anchoring parts to be introduced into the housing 120. In addition, the SIM card 110 is also guided by the inlet part 121 to be introduced into the housing 120.

As shown in FIGS. 15 and 16, if the SIM card 110 is placed into and seated in the housing 120, the contacts 111b protruding from a side of the SIM card are engaged with the patterned contacts 131b formed coplanar to the side of the printed circuit board 130 where the patterned contacts are provided. An elastic pressing means 1220 (FIG. 14) is provided at a position corresponding to the contacts 111b, and applies elastic force so that the SIM card 110 can come into pressurized contact with the printed circuit board 130.

The leaf springs of the elastic pressing means 1220 are formed to correspond with the contacts 111b in terms of position, so that the contacts 111b are pressed against the contacts patterns 131b making pressurized contact. Since the contacts 111b and the patterned contacts 131b are pressed by the leaf springs 1221 in the engaged state, the engagement can be stably maintained, and the SIM card 110 is electrically coupled with the printed circuit board 130, whereby the data stored in the SIM card 110 can be confirmed through the portable electronic device.

Now, a third exemplary embodiment of the present invention will be described in detail with reference to FIGS. 6 and 17 to 19. Here, it should be noted that among the components of the third exemplary embodiment, the components identical to those of the first and second exemplary embodiments will not be described in detail but indicated by the reference numerals used in the description of the first and second exemplary embodiments of the present invention.

As shown in FIGS. 6, and 17 to 19, the SIM card connecting device for a portable electronic device according to the third exemplary embodiment includes a printed circuit board 130, patterned contacts 131c, and a housing 120. The patterned contacts 131c are provided on a side of the printed circuit board 130 in such that the patterned contacts 131c are engaged with contacts 111c provided on the SIM card 110. In addition, the patterned contacts 131c are formed coplanar to the side of the printed circuit board 130.

The housing 120 is mounted on the printed circuit board 130, wherein the housing 120 allows the SIM card 110 to be inserted into/extracted from the housing 120, and when the SIM card 110 is inserted into the housing 120, the housing 120 applies pressure in such that the contacts 111c on the SIM card 110 and the patterned contacts 131c on the printed circuit board 130 come into pressurized contact with each other. In addition, the contacts 111c of the SIM card 110 are formed coplanar to the side of the SIM card 110 in which the contacts are formed. Therefore, the contacts 111c and the patterned contacts 131c come into pressurized contact with each other by the housing 120.

The third exemplary embodiment of the present invention is differentiated from the first exemplary embodiment in terms of the SIM patterns 131c formed on the printed circuit board 130 and the contacts 111c formed on the SIM card 110, and also differentiated from the second exemplary embodiment in terms of the contacts 111c formed on the SIM card 110.

In the first exemplary embodiment, the patterned contacts 131a formed on the printed circuit board are dome-shaped as shown in FIGS. 9 to 11, but in the second exemplary embodiment, the patterned contacts 131b are formed coplanar to the side of the printed circuit board 130 where the patterned contacts 131b are provided as shown in FIGS. 15 and 16.

Figure 17:
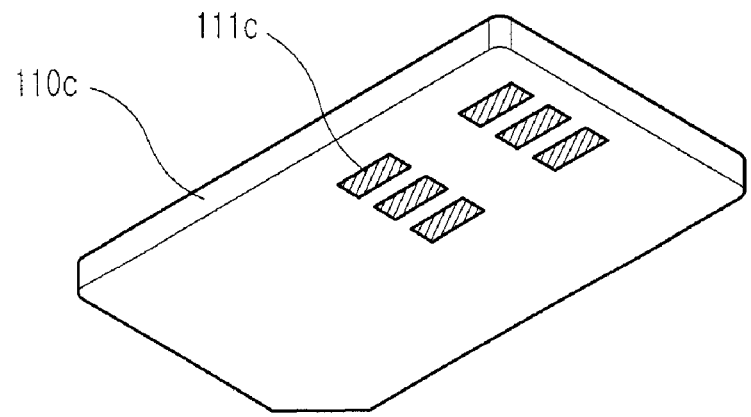
FIG. 17 is a perspective view showing a SIM card mounting part in a SIM card connecting device for a portable electronic apparatus according to a third exemplary embodiment of the present invention.
Figure 18:
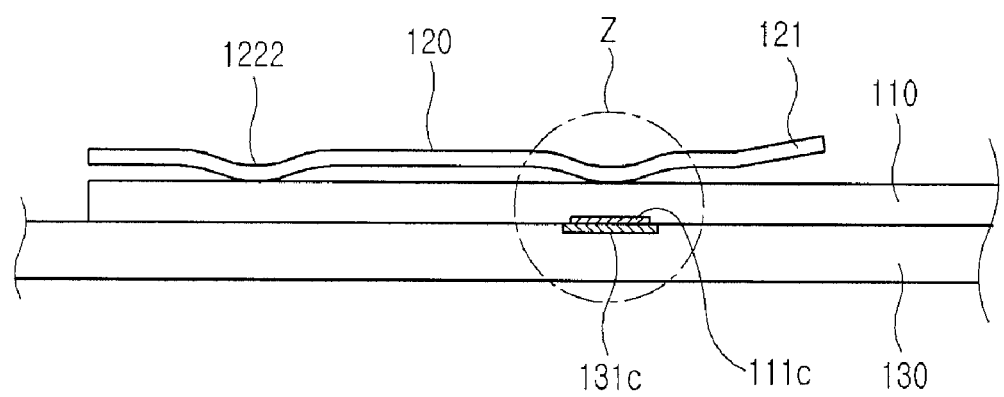
FIG. 18 is a cross-sectional view of the SIM card connecting device according to the third exemplary embodiment of the present invention in the assembled state.
Figure 19:
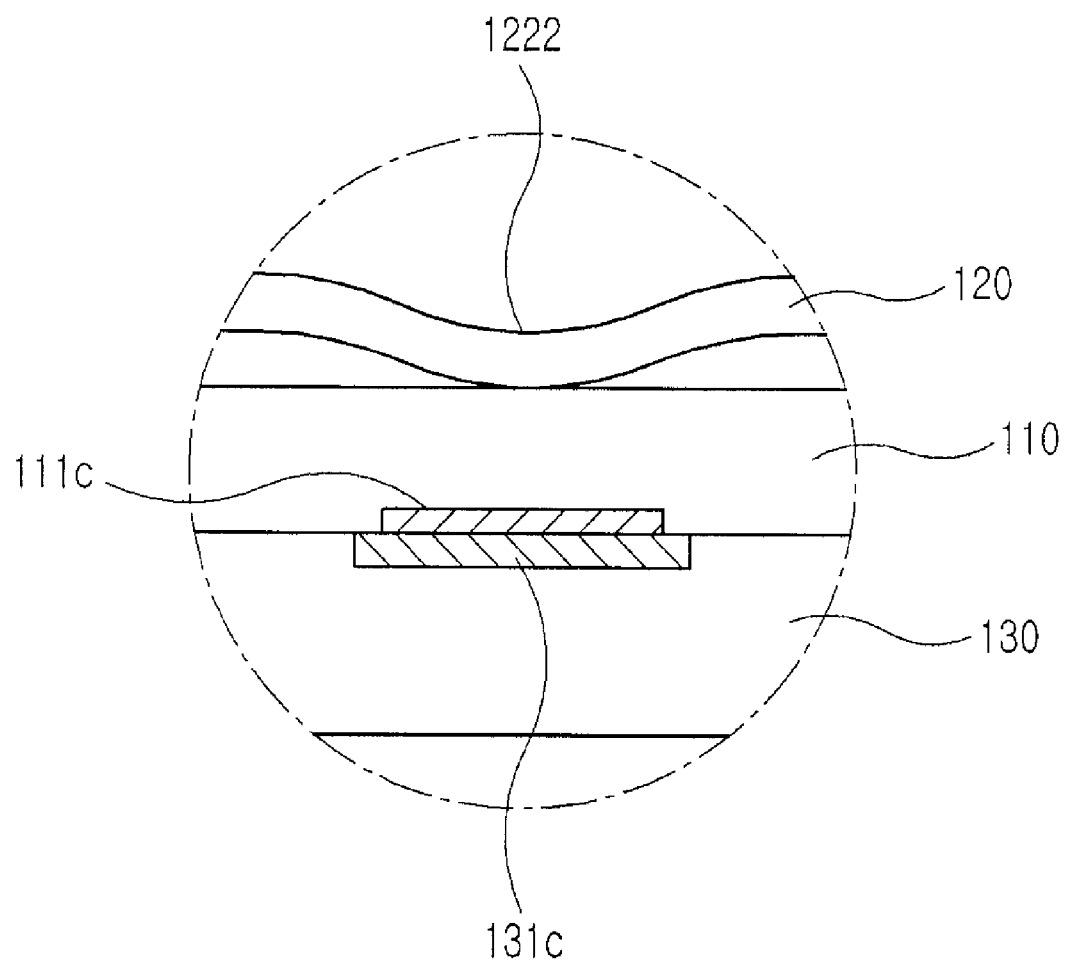
FIG. 19 is an enlarged view of "Z" part in FIG. 18.

In addition, as shown in FIGS. 12 to 16, the contacts 111b in the second exemplary embodiment protrudes from a side of the SIM card 110 by a predetermined height, but as shown in FIGS. 17, 18 and 19, the contacts 111c in the third exemplary embodiment are formed coplanar to the bottom side of the SIM card 110, making for a more compact SIM card.

That is, as shown in FIGS. 17 to 19, the patterned contacts 131c according to the third exemplary embodiment are formed coplanar to the side of the printed circuit board where they are formed, and the contacts 111c are formed coplanar to the side of the SIM card 110 where they are formed. Accordingly, it is possible to further reduce the height of the housing 120 as compared to the first and second exemplary embodiments.

That is, the height from the top side of the printed circuit board 130 to the top side of the plate 122 is preferably formed in the range of about 1.3 to 1.4 mm, and the height from the top side of the printed circuit board 130 to the lowest point of the leaf springs 1221 is preferably formed in the range of about 0.8 to 0.9 mm, which is about two times of the thickness of the SIM card 110. In addition, since the construction of the housing 120 is the same with that of the first exemplary embodiment, its detailed description will be omitted.

Now, the operation procedure of the SIM card connecting device for a portable electronic device according to the third exemplary embodiment of the present invention will be described.

The leading end of the SIM card 110 is guided by the anchoring parts to be introduced into the housing 120. If the SIM card 110 is introduced into the housing 120, the contacts 111c, which are coplanar to the side of the SIM card 110 where the contacts 111c are provided, are respectively engaged with the patterned contacts 131c which are coplanar to the side of the printed circuit board 130 where the patterned contacts 131c are provided. Leaf springs 1221 are formed in the plate 122 at a position corresponding to those of the contacts 111c and the patterned contacts 131c. Therefore, the leaf springs 1221 press the SIM card 110 at the position corresponding to the contacts 111c, so that the contacts 111c and the patterned contacts 131c are stably maintained in the pressed state.

As described above, according to the present invention, by mounting a housing for inserting a SIM card on a printed circuit board, and forming dome-shaped patterned contacts on a side of the printed circuit board opposite to the SIM card, so that the dome-shape patterned contacts are to be electrically coupled with contacts on the SIM card, it is possible to reduce the SIM card mounting space in a portable electronic device.

In addition, according to the present invention, by reducing the space occupied by a conventional SIM card socket, it is possible to reduce the thickness of a portable electronic device. In addition, by elastically pressing the patterned contacts and contacts so that they can come into close contact with each other, the electrical connection between the SIM card and the printed circuit board can be stably maintained.

In addition, according to the present invention, by forming the patterned contacts coplanar to the side of the printed circuit board where the patterned contacts are provided, and forming the contacts of the SIM card to protrude, thereby being engaged with the patterned contacts, it is possible to reduce the SIM card mounting space in a portable electronic device, whereby the portable electronic device can be even further reduced in thickness than known heretofore. In addition, according to the present invention, by providing an elastic pressing means for pressing the contacts against the patterned contacts, it is possible to stably maintain the electrical connection between the SIM card and the printed circuit board.

In addition, according to the present invention, by forming each of the patterned contacts in a dome shape, or in a flat shape coplanar to the side of the printed circuit board where the patterned contacts are provided, it is possible to prevent the contacts of the SIM card from being damaged, wherein such contacts have been damaged by a conventional socket connector. In addition, since the contacts and the patterned contacts are surface-contacted with each other, it is possible to obtain a broader contact area as compared to the conventional connector which is point-contacted or line-contacted with contacts, whereby the contacts and the patterned contacts can maintain a more stable connection state.

Moreover, according to the present invention, the patterned contacts are formed on the printed circuit board, and the housing for pressing the SIM card against the printed circuit board is provided, rather than using a conventional socket, the assembling process can be simplified as well as material costs can be saved, whereby the manufacturing cost can be reduced.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A Subscriber Identity Module (SIM) card connecting device for electrically coupling a SIM card to a portable electronic device, comprising:
    a printed circuit board;
    one or more patterned contacts provided on the printed circuit board being coupled with one or more contacts formed on the SIM card; and
    a housing mounted on the printed circuit board in which the SIM card is inserted into/extracted therefrom, and wherein when the SIM card is inserted into the housing, the housing presses the SIM card toward the printed circuit board so that the contacts of the SIM card and the patterned contacts come into substantially pressurized contact with each other;
    wherein a plurality of the patterned contacts on the printed circuit board are formed having a domed-shape, so that the patterned contacts are pressed at least partially downward when they come into substantially pressurized contact with the contacts of the SIM card, whereby the SIM card and the printed circuit board are electrically coupled with each other via the patterned contacts and SIM card contacts being coupled.

2. The SIM card connecting device as claimed in claim 1, wherein the housing comprises: an inlet part through which the SIM card is inserted into/extracted from the housing; a plate extending in the inserting direction of the SIM card from the inlet part, the plate being spaced from the printed circuit board by a predetermined height; and anchoring parts protruding from the plate toward the printed circuit board for connection to the printed circuit board, the anchoring parts being engaged with the opposite lateral edges of the SIM card so as to guide the insertion/extraction of the SIM card, and
    wherein the plate is provided with an elastic pressing means at a position corresponding to the contacts of the SIM card and the patterned contacts of the printed circuit board, so that when the SIM card is seated in the housing, the elastic pressing means provides substantially pressurized contact at a position of the contacts, wherein said substantially pressurized contact comprising an elastic force.

3. The SIM card connecting device as claimed in claim 2, wherein the elastic pressing means comprises: the plate having one or more holes formed there-through, and one or more leaf springs positioned in the holes to correspond to the contacts of the SIM card and the patterned contacts of the printed circuit board, in terms of position, so as to apply elastic force to the contacts of the SIM card.

4. The SIM card connecting device as claimed in claim 2, wherein the inlet part is formed in an upwardly slanted position from the plate surface, so that the inlet part provides a guide function for the insertion of the SIM card.

5. The SEM card connecting device as claimed in claim 2, wherein the anchoring parts comprise: a pair of guide anchoring protrusions extending from opposite lateral sides of the inlet part in a direction of extracting the SIM card, the guide anchoring protrusions being anchored to the printed circuit board to guide the insertion of a leading end of the SIM card; and one or more pairs of anchoring protrusions extending from the opposite lateral edges of the plate toward the printed circuit board and anchored to the printed circuit board, the anchoring protrusions being engaged with the opposite lateral edges of SIM card.

6. The SIM card connecting device as claimed in claim 5, wherein the guide anchoring protrusions are oppositely formed and diverge away from a front of the plate.

7. The SIM card connecting device as claimed in claim 6, wherein the printed circuit board is formed with mounting holes therein being sized for receiving the anchoring parts.

8. The SIM card connecting device as claimed in claim 7, wherein the anchoring parts are arranged in the mounting holes, and wherein tip ends of the anchoring parts extending from the mounting holes are subjected to surface mount device (SMD) soldering, thereby being soldered to an opposite side of the printed circuit board.

9. The SIM card connecting device as claimed in claim 8, wherein when the SIM card is inserted into the housing, said leading end of the SIM card is guided inside the housing by the inlet part and the guide anchoring protrusions, and
    wherein when the SIM card is seated inside of the housing, the contacts of the SIM card being electrically coupled with the patterned contacts protruding from the printed circuit board, and the elastic pressing means pressing at a position of the contacts, so that the contacts of the SIM card and the dome-shaped patterned contacts of the printed circuit board are electrically coupled to each other.

10. A Subscriber Identity Module (SIM) card connecting device for electrically coupling a SIM card to a portable electronic device, comprising:
a printed circuit board;
one or more patterned contacts provided on the printed circuit board and being coupled with one or more contacts formed on a SIM card; and
a housing mounted on the printed circuit board in which the SIM card is inserted into/extracted therefrom, and wherein when the SIM card is inserted into the housing, the housing presses the SIM card toward the printed circuit board so that the contacts of the SIM card and the patterned contacts come into pressurized contact with each other,
wherein the patterned contacts of the printed circuit board are coplanar to a side of the printed circuit board where the patterned contacts are positioned, and the contacts of the SIM card protrude toward the patterned contacts of the printed circuit board, wherein the contacts of the SIM card being electrically coupled with the patterned contacts of the printed circuit board.

11. The SIM card connecting device as claimed in claim 10, wherein the housing comprises: an inlet part through which the SIM card is inserted into/extracted from the housing; a plate extending in the inserting direction of the SIM card from the inlet part, the plate being spaced from the printed circuit board by a predetermined height; and anchoring parts protruding from the plate toward the printed circuit board for connection to the printed circuit board, the anchoring parts being engaged with the opposite lateral edges of the SIM card so as to guide the insertion/extraction of the SIM card, and
wherein the plate is provided with an elastic pressing means at a position corresponding to the contacts of the SIM card and the patterned contacts of the printed circuit board, so that when the SIM card is seated in the housing, the elastic pressing means provides pressurized contact at a position of the contacts, wherein said substantially pressurized contact comprising an elastic force for coupling the SIM card to the printed circuit board.

12. The SIM card connecting device as claimed in claim 11, wherein the elastic pressing means comprises: the plate having one or more holes formed there-through, and one or more leaf springs positioned in the holes to correspond, in position, to the contacts of the SIM card and the patterned contacts of the printed circuit board.

13. The SIM card connecting device as claimed in claim 11, wherein the inlet part is formed in an upwardly slanted position from the plate surface, so that the inlet part provides a guide function for the insertion of the SIM card.

14. The SIM card connecting device as claimed in claim 13, wherein the anchoring parts comprise: a pair of guide anchoring protrusions extending from opposite lateral sides of the inlet part in a direction of extracting the SIM card, the guide anchoring protrusions being anchored to the printed circuit board to guide the insertion of a leading end of the SIM card; and one or more pairs of anchoring protrusions extending from the opposite lateral edges of the plate toward the printed circuit board and anchored to the printed circuit board, the anchoring protrusions being engaged with the opposite lateral edges of SIM card.

15. The SIM card connecting device as claimed in claim 14, wherein the guide anchoring protrusions are oppositely formed and diverge away from a front of the plate.

16. The SIM card connecting device as claimed in claim 14, wherein when the SIM card is inserted into the housing, said leading end of the SIM card is guided inside the housing by the inlet part and the guide anchoring protrusions, and
wherein when the SIM card is seated inside of the housing, the contacts protruding by a predetermined height from the SIM card being electrically coupled with the patterned contacts of the printed circuit board are formed coplanar to the side of the printed circuit board where the patterned contacts are provided, and the elastic pressing means presses at a position of the contacts, so that the contacts of the SIM card and the patterned contacts of the printed circuit board are electrically coupled.

17. The SIM card connecting device as claimed in claim 11, wherein the printed circuit board is formed with mounting holes therein being sized for receiving the anchoring parts.

18. The SIM card connecting device as claimed in claim 11, wherein the anchoring parts are arranged in the mounting holes, and wherein tip ends of the anchoring parts extending from the mounting holes are subjected to surface mount device (SMD) soldering, thereby being soldered to the opposite side of the printed circuit board.

19. A Subscriber Identity Module (SIM) card connecting device for electrically coupling a SIM card to a portable electronic device, comprising:
a printed circuit board;
one or more patterned contacts provided on the printed circuit board and being coupled with one or more contacts formed on the SIM card; and
a housing mounted on the printed circuit board in which the SIM card is inserted into/extracted therefrom, and wherein when the SIM card is inserted into the housing, the housing presses the SIM card toward the printed circuit board so that the contacts of the SIM card and the patterned contacts come into pressurized contact with each other,
wherein the patterned contacts of the printed circuit board are formed coplanar to a side of the printed circuit board where the patterned contacts are positioned, and the contacts of the SIM card are formed coplanar to the side of the SIM card where the contacts are formed, so that the contacts of the SIM card are electrically coupled with the patterned contacts of the printed circuit board by the pressurized contact of the housing.

20. The SIM card connecting device as claimed in claim 19, wherein the housing comprises: an inlet part through which the SIM card is inserted into/extracted from the housing; a plate extending in the inserting direction of the SIM card from the inlet part, the plate being spaced from the printed circuit board by a predetermined height; and anchoring parts protruding from the plate toward the printed circuit board, so that they can be anchored to the printed circuit board, the anchoring parts being engaged with the opposite lateral edges of the SIM card so as to guide the insertion/extraction of the SIM card, and
wherein the plate is provided with an elastic pressing means at a position corresponding to the contacts of the SIM card and the patterned contacts of the printed circuit board, so that when the SIM card is seated in the housing, the elastic pressing means provides pressurized contact at a position of the contacts, wherein said pressurized contact comprising an elastic force.

21. The SIM card connecting device as claimed in claim 20, wherein the inlet part is formed in an upwardly slanted position from the plate surface, so that the inlet part provides a guide function for the insertion of the SIM card.

22. The SIM card connecting device as claimed in claim 20, wherein the anchoring parts comprise: a pair of guide anchoring protrusions extending from opposite lateral sides of the inlet part in a direction of extracting the SIM card, the guide anchoring protrusions being anchored to the printed circuit board to guide the insertion of a leading end of the SIM card; and one or more pairs of anchoring protrusions extending from the opposite lateral edges of the plate toward the printed circuit board and anchored to the printed circuit board, the anchoring protrusions being engaged with the opposite lateral edges of the SIM card.

23. The SIM card connecting device as claimed in claim 22, wherein the guide anchoring protrusions are oppositely formed and diverge away from a front of the plate.

24. The SIM card connecting device as claimed in claim 22, wherein the anchoring parts are received in the mounting holes, and tip ends of the anchoring parts extending from the mounting holes are subjected to surface mount device (SMD) soldering, thereby being soldered to an opposite side of the printed circuit board.

25. The SIM card connecting device as claimed in claim 24, wherein when the SIM card is inserted into the housing, said leading end of the SIM card is guided inside the housing by the inlet part and the guide anchoring protrusions, and wherein when the SIM card is seated inside of the housing, the contacts of the SIM card formed coplanar to the side of the SIM card being electrically coupled with the patterned contacts formed coplanar to the side of the printed circuit board where the patterned contacts are provided, and the elastic pressing means presses at a position of the contacts, so that the contacts of the SIM card and the patterned contacts of the printed circuit board are electrically coupled with each other.

26. The SIM card connecting device as claimed in claim 20, wherein the elastic pressing means comprises: the plate having one or more holes formed there-through, and one or more leaf springs positioned in the holes to correspond, in terms of position, to the contacts of the SIM card and the patterned contacts of the printed circuit board.

27. The SIM card connecting device as claimed in claim 19, wherein the printed circuit board is formed with mounting holes therein being sized for receiving the anchoring parts.

* * * * *

UNITED STATES PATENT AND TRADEMARK OFFICE
CERTIFICATE OF CORRECTION

| | | |
|---|---|---|
| PATENT NO. | : 7,950,945 B2 | Page 1 of 1 |
| APPLICATION NO. | : 12/627157 | |
| DATED | : May 31, 2011 | |
| INVENTOR(S) | : Hae-Won Ahn | |

It is certified that error appears in the above-identified patent and that said Letters Patent is hereby corrected as shown below:

--Column 12, Claim 5, Line 33, should read as follows:
 --The SIM card connecting...--

Signed and Sealed this
Third Day of January, 2012

David J. Kappos
*Director of the United States Patent and Trademark Office*